United States Patent [19]

Corbett

[11] 3,860,526

[45] Jan. 14, 1975

[54] SOLID BLOCK FLOCCULENT WITH CONTROLLED RELEASE RATE

[75] Inventor: Dennis Thomas Corbett, Chesterfield, England

[73] Assignee: Hemlab A.G., Chur, Switzerland

[22] Filed: July 27, 1972

[21] Appl. No.: 275,842

[52] U.S. Cl. ............... 252/181, 61/1 R, 210/51, 260/2.5 N, 260/2.5 H, 260/29.2 EP, 260/29.6 H, 264/122, 252/180
[51] Int. Cl. .................. B01d 21/02, C02b 1/20
[58] Field of Search ............ 21/2.7 R; 134/22 R; 260/29.2 EP; 252/8.55 E, 358, 176, 175, 181; 137/268

[56] References Cited
UNITED STATES PATENTS

| | | | |
|---|---|---|---|
| 3,085,916 | 4/1963 | Zimmie et al. | 134/22 R |
| 3,260,669 | 7/1966 | Schoen | 252/8.55 E |
| 3,435,618 | 4/1969 | Katzer | 61/1 |
| 3,554,287 | 1/1971 | Eilers et al. | 260/29.2 EP |
| 3,617,572 | 11/1971 | Monagle | 210/54 |
| 3,658,710 | 4/1972 | Puckorius et al. | 21/2.7 R |
| 3,676,363 | 11/1972 | Mosier | 252/8.55 E |

FOREIGN PATENTS OR APPLICATIONS

| | | | |
|---|---|---|---|
| 548,290 | 10/1942 | Great Britain | 252/176 |

*Primary Examiner*—Murray Tillman
*Assistant Examiner*—Arthur H. Koeckert

[57] ABSTRACT

A solid flocculant comprises a polymeric flocculant and a water soluble fixing agent mixed together and formed into a solid e.g. a block with the addition of water. The solid flocculant is placed in an effluent stream or other body of water and will release flocculant into the suspension at a controlled rate.

The polymeric flocculant is preferably present in the range of 5 to 25 per cent by weight, the water soluble fixing agent is preferably present in the range of 5 to 35 per cent by weight with the remainder being water so that a slow release rate exists.

19 Claims, No Drawings

SOLID BLOCK FLOCCULENT WITH CONTROLLED RELEASE RATE

This invention relates to a solid flocculant and more particularly to a solid material in block form that will function as a flocculant to settle solids in dynamic suspensions typified by effluent streams.

In order to settle suspended material in a stream, it is most advantageous simply to add a block of solid material once each working shift and this will settle the suspended solids.

However, it has been discovered that simply compressing polymer flocculant into a block has not succeeded in achieving this object because a colloidal gel is formed at the surface of the block and this impedes the release of flocculant into the effluent stream.

It is therefore an object of the present invention to provide a solid flocculant which will release the flocculant material at a controlled rate which will not signigicantly be impeded as time goes by.

Yet another object of the present invention is to provide a solid flocculant that can be produced readily through modern manufacturing methods at reasonable costs.

The foregoing, as well as other objects of the invention, are achieved by providing a solid flocculant that comprise a polymeric flocculant present in proportions by weight of 0.1% to 60%, a water soluble fixing agent present in proportions by weight of 0.5% to 94.9% and the balance being water with the relative proportions of these ingredients being adjusted to form a solid.

In order to form a solid that will dissolve in an effluent stream or other body of water to release the polymeric flocculant slowly and at reasonably controlled rate, it is preferred to have a range by weight of 0.1% to 50% by weight of flocculant, with the preferred range being from 5% to 25% by weight.

With respect to the water soluble fixing agent, it is preferred to have in proportions by weight of the total solid from 0.5% to 60, with the preferred range being from 5% to 35%.

The remaining ingredient is water which is added to the combined polymeric flocculant and water soluble fixing agent. The water is present by weight in the amount of 5% to 80% with the preferred range being 35% to 70%.

The solid flocculant having a slow release rate is made by mixing the polymeric flocculant and the water soluble fixing agent to form a dry mix. Then, water is added to the dry mix to form a slurry which is cast into solid form.

While the applicant does not wish to be bound by any theory, it is believed that when water is added to the dry mix the fixing agent dissolves first to form a solution into which the polymeric flocculant is taken up. A rigid open structure is formed, the molecules of the fixing agent separating those of the polymeric flocculant. When the solid is added to water, this breaks down the rigid structure slowly, so releasing the flocculant at a steady rate.

To form a solid flocculant having a fast release rate it is preferred to use 0.1 to 10% by weight of flocculant, sufficient water to moisten the flocculant, balance fixing agent. The flocculant and fixing agent are dry mixed with the water to form a moist mass which is compressed into a solid by pressure, using, e.g., a tabletting machine. Such a fast release solid may be placed in the effluent stream or other body of water, following which the fixing agent is quickly released for example to have an effect on the pH of the affluent. The flocculant is also released for an ancillary flocculating effect.

The flocculant ingredient preferably comprises one or more of a homo or copolymer of a substituted or unsubstituted acrylamide, such as polyacrylamide, a partially hydrolysed polyacrylamide or partially quaterised polyacrylamide; or another polymer comprising a polymerised amide, amine, imine, ethylene imine or ethoxy residue. The polymer preferably has a molecular weight of 100,000 to 30 million, most advantageously one million to 15 million. Naturally occuring materials may also be used as all or part of the flocculant ingredient.

The fixing agent is typically a water-soluble salt of an inorganic acid, the salts specifically used being determined by the nature of the polymer acting as flocculant. Examples of such salts include sodium, potassium and ammonium salts of carbonic, sulphuric, silicic, benzoic, citric, phosphoric and boric acid. For low hydrolysed polyacrylamide the fixing agent may be sodium carbonate while for medium hydrolysed polyacrylamide the use of sodium tetraborate, alone or with a carbonate, is preferred. For a highly hydrolysed polyacrylamide it is preferred to use a carbonate and for cationic polymers the use of tripolyphosphate may be preferred.

The solid flocculant is most preferably made by mixing a flocculant and fixing agent therefor and adding the mix to water and mixing that to form a slurry which is then poured into a mould where is sets solid. Mixing times and rates may be adjusted according to need and the slurry setting time may be adjusted from about 5 minutes to about 12 hours. The solid is preferably a block or cylinder, the shape being determined by the rate of release of flocculant which is proportional to the surface area. A block about 500 cu. cm. (40 cu. ins.) in a stream flowing at a rate of 454 l/hr. (100 gal/hr) at 20°C had fairly constant release which gave a concentration of 1ppm of flocculant for a period of 24 hours. A block may be made to release flocculant for say between 12 hours and 8 days.

Flocculation using blocks of the invention may be done for aqueous suspensions which are alkaline or neutral or acid.

The invention includes a method of making the solid flocculant, the flocculant when so made and the method of using it in flocculation.

Reference is now made to the following non-limiting examples which are set forth hereinafter for the purpose of disclosing examplary embodiments of the invention.

EXAMPLE 1

In this example, and examples 2 to 8, the polymeric flocculant and water soluble fixing agent are dry mixed, then water is added to form a slurry. This product is poured into a mould to form blocks or cubes. In all examples, except as except as specially indicated, the solid block product is used in flocculating zinc hydroxide sludge in a zinc plating effluent at a pH of 8.5. The blocks were held in a wire basket in the effluent stream and were replenished after each working shift. Investigations showed that the flocculant was released at a substantially constant rate during the shifts by dissolution of the block and satisfactory flocculation took place.

In this first example the polymeric flocculant was anionic polyacrylamide having a molecular weight of 15 million and was used on a 25% weight basis. The water soluble fixing agent was sodium carbonate used on a 30% weight basis. These two materials were dry mixed and then water was added on a 45% weight basis. The resultant block proved to be very satisfactory in flocculating the zinc plating effluent.

EXAMPLE 2

In this example the polymeric flocculant was highly hydrolised polyacrylamide with a molecular weight of 15 million and present on a six percent weight basis. The water soluble fixing agent was sodium carbonate present on a 42% weight basis and to the dry mix was added water on a 52% weight basis. The resulting solid flocculant showed a substantially constant flocculant release action.

EXAMPLE 3

The polymeric flocculant was medium hydrolised polyacrylamide with a molecular weight of 20 million and present on a 8% weight basis. The fixing agents were sodium tetraborate (5% weight basis) and sodium carbonate (37% weight basis). After the dry mixing, water (50% weight basis) was added and the resultant block showed substantially constant flocculating action.

EXAMPLE 4

The polymeric flocculant was cationic polyacrylamide with a molecular weight of 2 million (15% weight basis). The water soluble fixing agent was sodium tripolyphosphate (35% weight basis) and water was added to the dry mix on a 50% weight basis. The resulting solid block showed good flocculating properties in the zinc plating effluent.

EXAMPLE 5

The flocculant was anionic polyacrylate, molecular weight ten million (15% weight basis). The water soluble fixing agent was sodium bicarbonate (55% weight basis) and water (30% weight basis) was added to the resulting dry mix. The resulting solid block was quite satisfactory in use.

EXAMPLE 6

The flocculant was non ionic polyacrylamide, molecular weight 8 million (25% weight basis. The water soluble bonding agent was sodium benzoate (35% weight basis) and water was present on a 40% weight basis. The resultant solid block showed good flocculating properties.

EXAMPLE 7

The flocculant was highly hydrolised polyacrylamide, molecular weight 5 million (35% weight basis). The water soluble bonding agent was potassium carbonate (10% weight basis) and the water added to the dry mix was on a 55% weight basis. The resulting solid block exhibited good flocculating properties on the zinc plating effluent.

EXAMPLE 8

The flocculant was cationic polyacrylamide, molecular weight 5 million (20% weight basis). The fixing agent was sodium tetraborate (10% weight basis). Water was used on a 70% weight basis. The resulting solid block showed constant flocculant release properties over an extended period of time.

EXAMPLE 9

Polyethylene oxide, molecular weight 1 million, one part was moistened with water, two parts, and taken up in sodium carbonate, 97 parts. The resulting damp powder was compressed in a tabletting pressure die to form a block. This was added to the gas waters of a gas scrubbing process in which the block dissolved to release the carbonate to adjust the pH of the gas waters and to release the flocculent for an ancillary flocculating effect.

From the foregoing it can be seen that the polymeric flocculant and the fixing agent can be selected from a wide group of materials that will readily occur to those skilled in the art.

The water soluble fixing agent is generally a water soluble salt of an inorganic or organic acid and the invention is not limited to any particular fixing agents. By simple experimentation it can be readily determined which polymeric flocculants are compatible with a variety of water soluble fixing agents in order to produce a satifactory solid flocculant.

The method of use of the present invention involves the use of the solid flocculant in treating an effluent or other body of water.

Without further elaboration the foregoing will so fully illustrate my invention that others may, by applying current or future knowledge, readily adapt the same for use under various conditions of service.

What is claimed as the invention is:

1. A solid composition which releases a flocculent at a controlled rate upon immersion in an aqueous medium to be treated which consists essentially of:
   a. 0.1 to 60% by weight of a polymeric flocculent having a molecular weight of from 100,000 to 30 million;
   b. 0.5% to 94.9% by weight of the sodium, potassium or ammonium salt of carbonic acid, sulphuric acid, silicic acid, benzoic acid, citric acid, phosphoric acid or boric acid as the fixing agent;
   provided that when the flocculent is a medium hydrolyzed polyacrylamide, the fixing agent is said salt or sodium tetraborate in combination with said carbonate salt; and
   c. 5% to 80% by weight of water.

2. A composition according to claim 1 wherein the flocculent is present in the amount of 5% to 25% by weight, and the fixing agent is present in the amount of 0.5% to 60% by weight.

3. A composition according to claim 2 wherein the fixing agent is present in the amount of 5% to 35% by weight.

4. A composition according to claim 3 wherein the water is present in the amount of 35% to 70% by weight.

5. A composition according to claim 1 which releases the flocculent at a rapid controlled rate wherein the flocculent is present in the amount of 0.1% to 10% by weight.

6. A composition according to claim 4 wherein the flocculent has a molecular weight of 1 million to 15 million.

7. A composition according to claim 1 wherein the flocculent is highly hydrolyzed polyacrylamide, medium hydrolyzed polyacrylamide, polyacrylate, polyacrylamide or polyethylene oxide and the fixing agent is sodium carbonate, sodium tetraborate, sodium tripolyphosphate, sodium bicarbonate, sodium benzoate or potassium carbonate, or the flocculent is a medium hydrolyzed polyacrylamide and the fixing agent is sodium tetraborate in combination with sodium or potassium carbonate.

8. The composition according to claim 1, wherein the flocculent is anionic polyacrylamide having a molecular weight of 15 million present in the amount of 25% by weight, the fixing agent is sodium carbonate present in the amount of 30% by weight and water present in the amount of 45% by weight.

9. The composition according to claim 1, wherein the flocculent is a highly hydrolized polyacrylamide having a molecular weight of 15 million present in the amount of 6% by weight, the fixing agent is sodium carbonate present in the amount of 42% by weight and water present in the amount of 52% by weight.

10. The composition according to claim 1, wherein the flocculent is a medium hydrolized polyacrylamide having a molecular weight of 20 million present in the amount of 8% by weight, the fixing agent is sodium tetraborate present in the amount of 5% by weight and water present in the amount of 50% by weight.

11. The composition according to claim 1, wherein the flocculent is cationic polyacrylamide having a molecular weight of 2 million present in the amount of 15% by weight, the fixing agent is sodium tripolyphosphate present in the amount of 35% by weight and water present in the amount of 50% by weight.

12. The composition according to claim 1, wherein the flocculent is anionic polyacrylate having a molecular weight of 10 million present in the amount of 15% by weight, the fixing agent is sodium bicarbonate present in the amount of 55% by weight and water present in the amount of 30% by weight.

13. The composition according to claim 1, wherein the flocculent is non ionic polyacrylamide having a molecular weight of 8 million present in the amount of 25% by weight, the fixing agent is sodium benzoate present in the amount of 35% by weight and water present in the amount of 40% by weight.

14. The composition according to claim 1, wherein the flocculent is highly hydrolyzed polyacrylamide having a molecular weight of 5 million present in the amount of 35% by weight, the fixing agent is potassium carbonate present in the amount of 10% by weight and water present in the amount of 55% by weight.

15. The composition according to claim 1, wherein the flocculent is cationic polyacrylamide having a molecular weight of 5 million present in the amount of 20% by weight, the fixing agent is sodium tetraborate present in the amount of 10% by weight and water present in the amount of 70% by weight.

16. The composition according to claim 1, wherein the flocculent is polyethylene oxide having a molecular weight of 1 million, the fixing agent is sodium carbonate and wherein the flocculent, the fixing agent and the water are present in the proportions of 1:97:2.

17. A process for the production of a composition according to claim 1 which comprises mixing the flocculent and fixing agent to form a dry mix, adding the water to form a slurry or a moist mass and forming the composition produced into a solid.

18. A process according to claim 17, wherein the flocculent is highly hydrolyzed, polyacrylamide, medium hydrolyzed polyacrylamide, polyacrylate, polyacrylamide or polyethylene oxide and the fixing agent is sodium carbonate, sodium tetraborate, sodium tripolyphosphate, sodium bicarbonate, sodium benzoate or potassium carbonate, or the flocculent is a medium hydrolyzed polyacrylamide and the fixing agent is sodium tetraborate in combination with sodium or potassium carbonate.

19. A process according to claim 17, wherein the flocculent is present in the amount of 5% to 25% by weight and the fixing agent is present in the amount of 5% to 35% by weight.

* * * * *